(12) United States Patent
Viorel

(10) Patent No.: US 11,115,109 B2
(45) Date of Patent: Sep. 7, 2021

(54) METHODS AND SYSTEMS FOR ESTABLISHING A CONNECTION BETWEEN DEVICES IN UNLICENSED RADIO FREQUENCY SPECTRUM

(71) Applicant: CABLE TELEVISION LABORATORIES, INC., Louisville, CO (US)

(72) Inventor: Dorin Gheorghe Viorel, Erie, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 15 days.

(21) Appl. No.: 16/363,976

(22) Filed: Mar. 25, 2019

(65) Prior Publication Data
US 2020/0136714 A1   Apr. 30, 2020

Related U.S. Application Data

(60) Provisional application No. 62/753,576, filed on Oct. 31, 2018.

(51) Int. Cl.
| *H04W 74/08* | (2009.01) |
| *H04B 7/08* | (2006.01) |
| *H04W 16/14* | (2009.01) |
| *H04W 56/00* | (2009.01) |
| *H04B 17/318* | (2015.01) |
| *H04W 74/00* | (2009.01) |

(52) U.S. Cl.
CPC .......... *H04B 7/088* (2013.01); *H04B 7/0862* (2013.01); *H04B 17/318* (2015.01); *H04W 16/14* (2013.01); *H04W 56/001* (2013.01); *H04W 74/006* (2013.01); *H04W 74/0816* (2013.01)

(58) Field of Classification Search
CPC .... H04B 7/088; H04B 17/318; H04B 7/0862; H04W 16/14; H04W 56/001; H04W 74/006; H04W 74/0816
See application file for complete search history.

(56) References Cited

U.S. PATENT DOCUMENTS

| 2017/0238249 | A1* | 8/2017 | Yoon ................ H04W 52/0206 370/311 |
| 2018/0368142 | A1* | 12/2018 | Liou ..................... H04W 16/14 |
| 2019/0082471 | A1* | 3/2019 | Tsai ...................... H04L 5/0048 |
| 2019/0132882 | A1* | 5/2019 | Li ..................... H04W 74/0816 |
| 2019/0387546 | A1* | 12/2019 | Li ..................... H04W 74/0808 |
| 2020/0045735 | A1* | 2/2020 | Kim ..................... H04W 52/42 |
| 2020/0092913 | A1* | 3/2020 | Xu ........................ H04W 48/16 |
| 2020/0112360 | A1* | 4/2020 | Krunz ................... H04B 7/086 |
| 2020/0329503 | A1* | 10/2020 | Da Silva ............... H04W 72/02 |

* cited by examiner

*Primary Examiner* — Kodzovi Acolatse
(74) *Attorney, Agent, or Firm* — PdZ Patent Law, PLLC

(57) ABSTRACT

A method for establishing a wireless connection between a user equipment (UE) device and a base station in unlicensed radio frequency (RF) spectrum includes (a) receiving, at the UE device, a plurality of RF beams broadcasted by the base station, (b) identifying a selected RF beam of the plurality of RF beams having control information with a maximum received signal level, and (c) identifying a first channel occupancy time (COT1) of the base station from control information of the selected RF beam.

17 Claims, 8 Drawing Sheets

METHODS AND SYSTEMS FOR ESTABLISHING A CONNECTION BETWEEN DEVICES IN UNLICENSED RADIO FREQUENCY SPECTRUM

This Application claims benefit of priority to U.S. Provisional Patent Application Ser. No. 62/753,576, filed on Oct. 31, 2018, which is incorporated herein by reference.

BACKGROUND

Radio frequency (RF) spectra may be grouped into licensed spectra and unlicensed spectra. Licensed spectra requires permission for use, such as permission for use from a government authority. Unlicensed spectra may not require permission for use, although use of unlicensed spectra may be conditioned on following certain rules. An example of licensed spectra includes cellular spectra licensed by government authorities to mobile telephone carriers for use in mobile telephone networks, and an example of unlicensed spectra includes Wi-Fi spectra. Some communication systems operate solely with licensed spectra, and some communication systems operate solely with unlicensed spectra. Additionally, some communication systems are capable of operating over both licensed spectra and unlicensed spectra, such to increase their communication bandwidth.

DETAILED DESCRIPTION OF THE EMBODIMENTS

Two or more wireless communication systems may share common RF spectrum. For example, two different wireless communication systems of a common type, e.g., two Wi-Fi wireless communication systems, may share common unlicensed spectrum. As another example, two different wireless communication systems using different access technologies, e.g., a fifth-generation (5G) new radio (NR) wireless communication system and a Wi-Fi wireless communication system, may share common unlicensed spectrum. Multiple wireless communication systems sharing common RF spectrum must operate such that the wireless communication systems do not interfere with each other; otherwise, the performance of some of these wireless communication systems may get degraded.

It may be particularly challenging for two or more different types of wireless communication access systems to share common RF spectrum. For example, a NR wireless communication system and Wi-Fi wireless communication system sharing common RF spectrum will typically not be aware of each other's presence, which may make it difficult to avoid interference between the two wireless communication systems. However, disclosed herein are methods and systems which help meet this challenge. Certain embodiments of the disclosed methods and systems facilitate use of a wireless communication system operating according to a licensed spectrum protocol in unlicensed spectrum. The disclosed methods and systems, for example, provide support for NR signals and channels in unlicensed spectrum, such that NR wireless communication systems may coexist with other communication system types, such as Wi-Fi communication systems, without interference.

Figure 1:
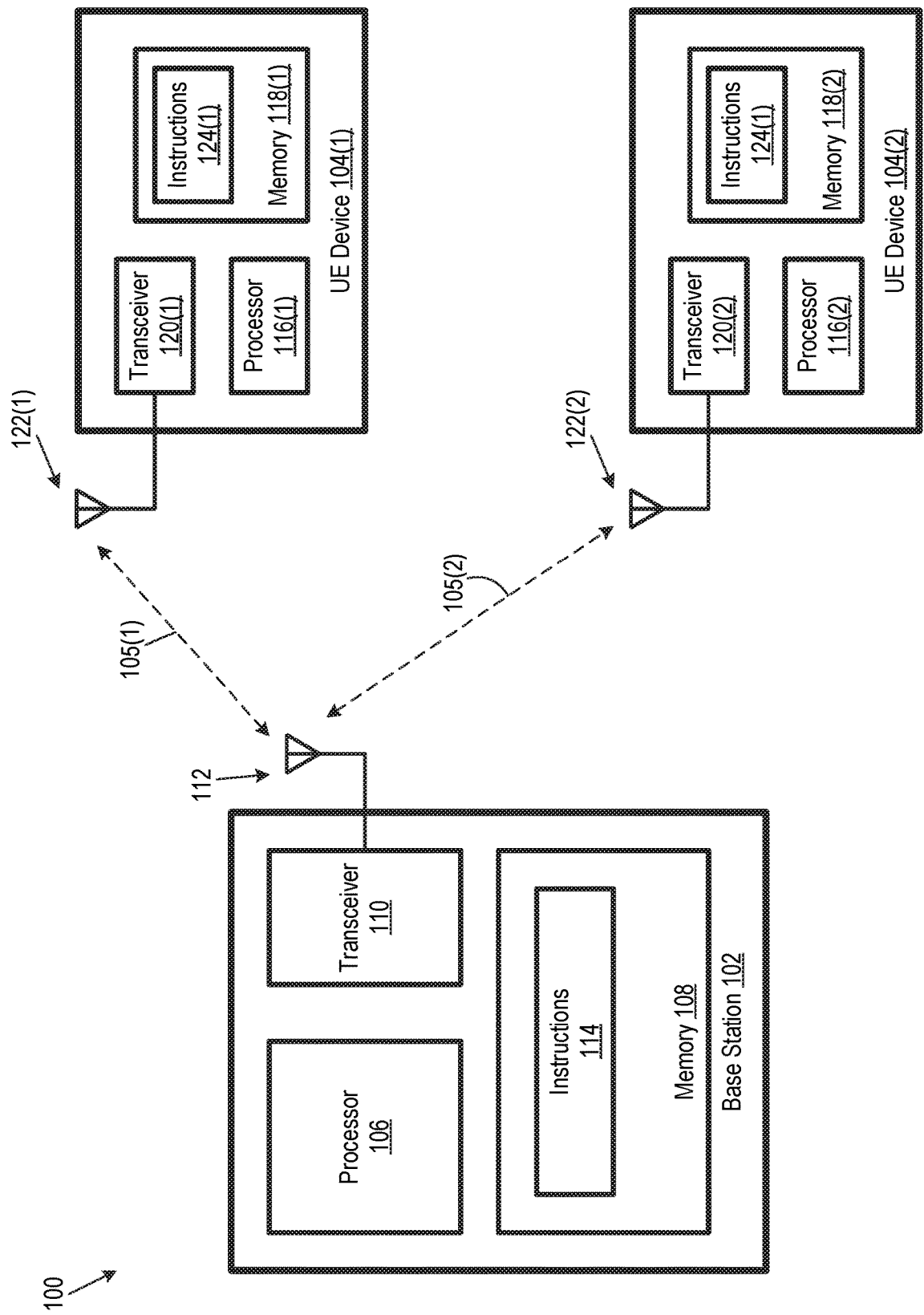
FIG. 1 is a schematic diagram illustrating a radio access network (RAN) section of a wireless communication system, according to an embodiment.

FIG. 1 is a schematic diagram illustrating a RAN section of a wireless communication system 100, which is one embodiment of the new systems disclosed herein. Wireless communication system 100 includes a base station 102 and one or more UE devices 104. In this document, specific instances of an item may be referred to by use of a numeral in parentheses (e.g., UE device 104(1)) while numerals without parentheses refer to any such item (e.g., UE devices 104). Base station 102 communicates with UE devices 104 via RF signals 105. In some embodiments, RF signals 105 are within unlicensed RF spectrum, e.g., RF spectrum that is shared by wireless communication system 100 and one or more Wi-Fi wireless communication systems. Examples of base station 102 include, but are not limited to, a long-term evolution (LTE) base station (e.g., an eNB device), a NR base station (e.g., a gNB device), a sixth Generation (6G) wireless communication base station, and variations and/or extensions thereof. Examples of UE devices 104 include, but are not limited to, a computer, a set-top device, a data storage device, an Internet of Things (IoT) device, an entertainment device, a wireless access point, a computer networking device, a mobile telephone, a smartwatch, a wearable device with wireless capability, and a medical device. In some embodiments, each of base station 102 and UE devices 104 operate according to a NR protocol, e.g., a New Radio—Unlicensed (NR-U) protocol.

Each UE device 104 need not be of the same type. For example, in one embodiment, UE device 104(1) is a mobile telephone, and UE device 104(2) is an IoT device. The number of base stations 102 and the number of UE devices 104 may vary without departing from the scope hereof. For example, wireless communication system 100 may include additional base stations 102, such as to extend coverage over a larger geographical area. As another example, wireless communication system 100 may include additional UE devices 104.

Base station 102 includes a processor 106, a memory 108, a transceiver 110, and an antenna 112. Processor 106 is configured to execute instructions 114 stored in memory 108 to control base station 102. Transceiver 110 is communicatively coupled to antenna 112, and transceiver 110 interfaces antenna 112 with other components of base station 102. For example, in some embodiments, transceiver 110 converts electrical signals generated by processor 106 into RF signals for transmission to UE devices 104 via antenna 112, and transceiver 110 converts RF signals received from UE devices 104 via antenna 112 into electrical signals for processor 106. One or more elements of base station 102 may include multiple sub-elements. For example, processor 106 could include a plurality of sub-processors, memory 108 could include a plurality of memory modules, and antenna 112 could include multiple radiating/receiving elements. Additionally, processor 106 and memory 108 could be replaced with other circuitry, e.g. analog and/or digital electronic circuitry, performing similar functions to processor 106 and memory 108. Furthermore, although base station 102 is illustrated as being a self-contained device, two or more elements of base station 102 could be distributed among multiple locations. For example, processor 106 and memory 108 could be located at a different location than transceiver 110 and antenna 112. Moreover, multiple instances of base station 102 could share one or more elements without departing from the scope hereof.

Each UE device 104 includes a processor 116, a memory 118, a transceiver 120, and an antenna 122. Processor 116 is configured to execute instructions 124 stored in memory 118 to control UE device 104. Transceiver 120 is coupled to antenna 122, and transceiver 120 interfaces antenna 122 with other components of UE device 104. For example, in some embodiments, transceiver 120 converts electrical signals generated by processor 116 into RF signals for transmission to base station 102 via antenna 122, and transceiver 120 converts RF signals received from base station 102 via antenna 122 into electrical signals for processor 116. Processor 116 and memory 118 could be replaced with other circuitry, e.g. analog and/or digital electronic circuitry, performing similar functions to processor 116 and memory 118. One or more elements of UE device 104 may include multiple sub-elements. For example, processor 116 could include a plurality of sub-processors, memory 118 could include a plurality of memory modules, and antenna 122 could include multiple radiating/receiving elements.

Figure 2:
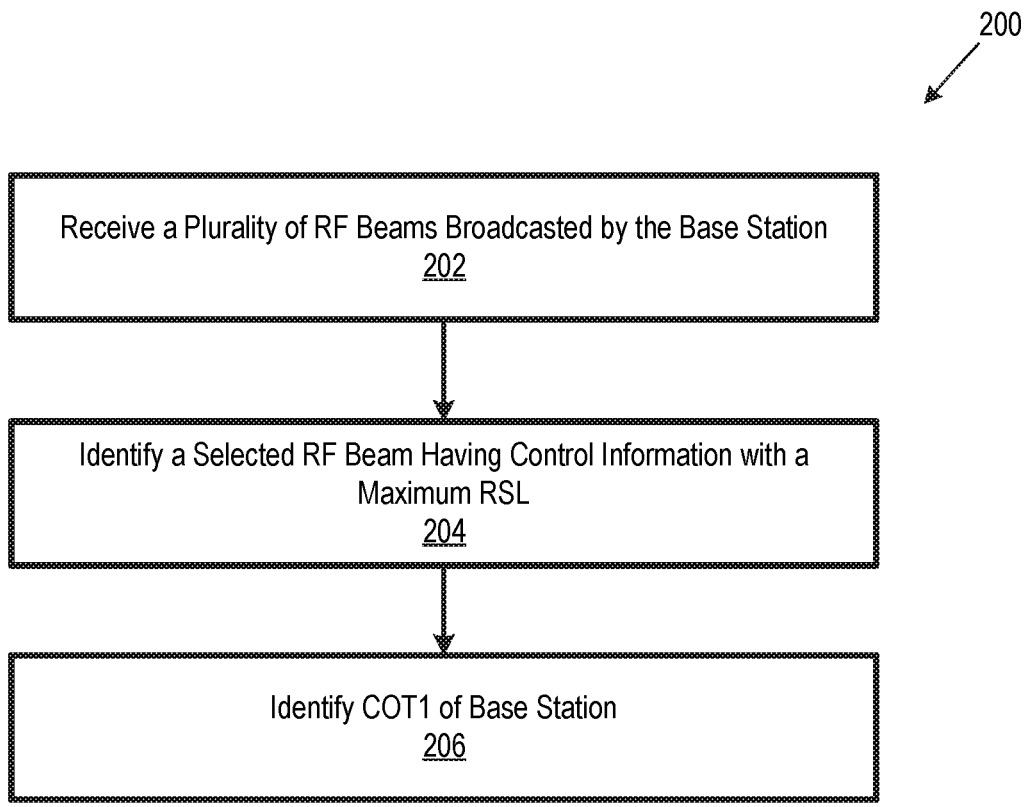
FIG. 2 is a flow chart illustrating a method for establishing a wireless connection between a user equipment (UE) device and a base station in unlicensed RF spectrum, according to an embodiment.

In particular embodiments, each UE device 104 is configured to execute a method 200 of FIG. 2 to establish a wireless connection between the UE device 104 and base station 102, in unlicensed RF spectrum. Method 200 is discussed below primarily with respect to only one UE device, i.e. 104(1), for simplicity. It should be appreciated, however, that method 200 and its associated principles are applicable to any UE device 104. In block 202 of method 200, UE device 104(1) receives a plurality of RF beams broadcasted by base station 102. In one example of block 202, processor 116(1) executes instructions 124(1) to receive a plurality of RF beams via antenna 122(1) and transceiver 120(1).

Figure 3:
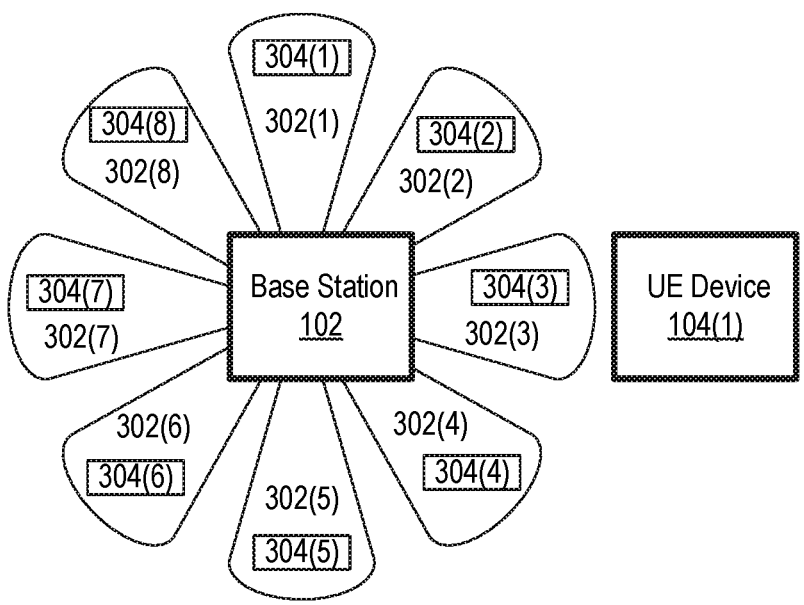
FIG. 3 is a schematic diagram of a base station broadcasting a plurality of RF beams, according to an embodiment.

FIG. 3 is a schematic diagram illustrating one example base station 102 broadcasting a plurality of RF beams 302. In this example, processor 106 of base station 102 executes instructions 114 to cause transceiver 110 and antenna 112 to broadcast each RF beam 302 in a different respective direction. Although FIG. 3 depicts base station 102 as broadcasting eight RF beams 302, base station 102 could be modified to broadcast a different number of RF beams 302 without departing from the scope hereof. It should be noted that UE device 104(1) (and any other UE device 104) will not necessarily receive all broadcasted RF beams 302, such as in applications where there is an object located between one or more RF beams 302 and UE device 104(1). Processor 106 further executes instructions 114 such that base station 102 performs a directive clear channel assessment (CCA) before broadcasting each RF beam 302. Base station 102 performs a CCA by checking whether the RF spectrum used by wireless communication system 100 is clear for the direction of each beam, i.e., no other device is currently transmitting a signal through the RF spectrum. If the CCA is successful, i.e. the RF spectrum is clear, base station 102 broadcasts an RF beam 302($i$), where $i=1 \ldots 8$ in one embodiment. Base station 102 may broadcast all i RF beams 302 or only some RF beams 302, depending on base station 102's configuration and/or operating conditions. If the CCA is unsuccessful, i.e., the RF spectrum is not clear, base station 102 does not broadcast an RF beam 302($i$), where $i=1 \ldots 8$ in some embodiments, and base station 102 instead waits a predetermined or random amount of time and subsequently performs an additional CCA. This waiting and CCA sequence (known in some embodiments as Listen Before Talk or LBT) is repeated until a CCA is successful, and base station 102 then broadcasts an RF beam 302. In some embodiments, base station 102 broadcasts only one RF beam 302 at a time, and in some other embodiments, base station 102 broadcasts two or more RF beams 302 at a time.

Processor 106 further executes instructions 114 such that each RF beam 302 includes control information 304. Control information 304 includes, for example, synchronization signals for synchronizing UE devices 104 with base station 102 and/or signals indicating system properties of base station 102. In some embodiments where base station 102 and UE 104(1) operate according to a NR protocol, control information 304 includes a synchronization signal block (SSB). One example of a SSB is discussed below with respect to FIG. 7. Base station 102 performs a CCA before transmitting each portion of control information 304 to UE device 104(1).

Referring again to FIG. 2, in block 204, UE device 104(1) identifies a selected RF beam, where the selected RF beam is one of the plurality of RF beams received and detected at UE device 104(1) and has control information received with a maximum received signal level (RSL) of all received RF beams. In one example of block 204, processor 116(1) executes instructions 124(1) to identify RF beam 302(3) as the selected RF beam 302, because control information 304(3) is received with a maximum RSL, due to RF beam 302(3)'s proximity and alignment with UE device 104(1).

Each device of wireless communication system 100 could take control of the unlicensed RF spectrum of RF signals 105 during a respective Channel Occupancy Time (COT). For example, base station 102 takes control of the RF spectrum during a respective COT, and UE device 104(1) has control of (e.g. could transmit over) the RF spectrum during a respective COT. Only one device of wireless communication system 100 can transmit (e.g. possess a COT) at a given time, to prevent conflict/interference among the devices sharing the same spectrum for a given location. A wireless connection between UE device 104(1) and base station 102 could be initiated during a first Channel Occupancy Time (COT1) of base station 102. Two nodes could transmit, following a certain logical sequence during the same COT1 in wireless communication system 100, e.g., as discussed below. Consequently, each UE device 104 needs parameters of COT1, e.g., COT1 starting point, COT1 duration, and COT1 priority class, to enable the UE device 104 and base station 102 to cooperate and initiate a wireless connection during COT1. However, UE devices 104 cannot rely on base station 102 to transmit COT1 parameters to the UE devices because such transmission may be unsuccessful, e.g., due to the presence of a hidden node visible only to the UE device 104 which degrades the signals received by UE device 104 received from base station 102.

Figure 4:
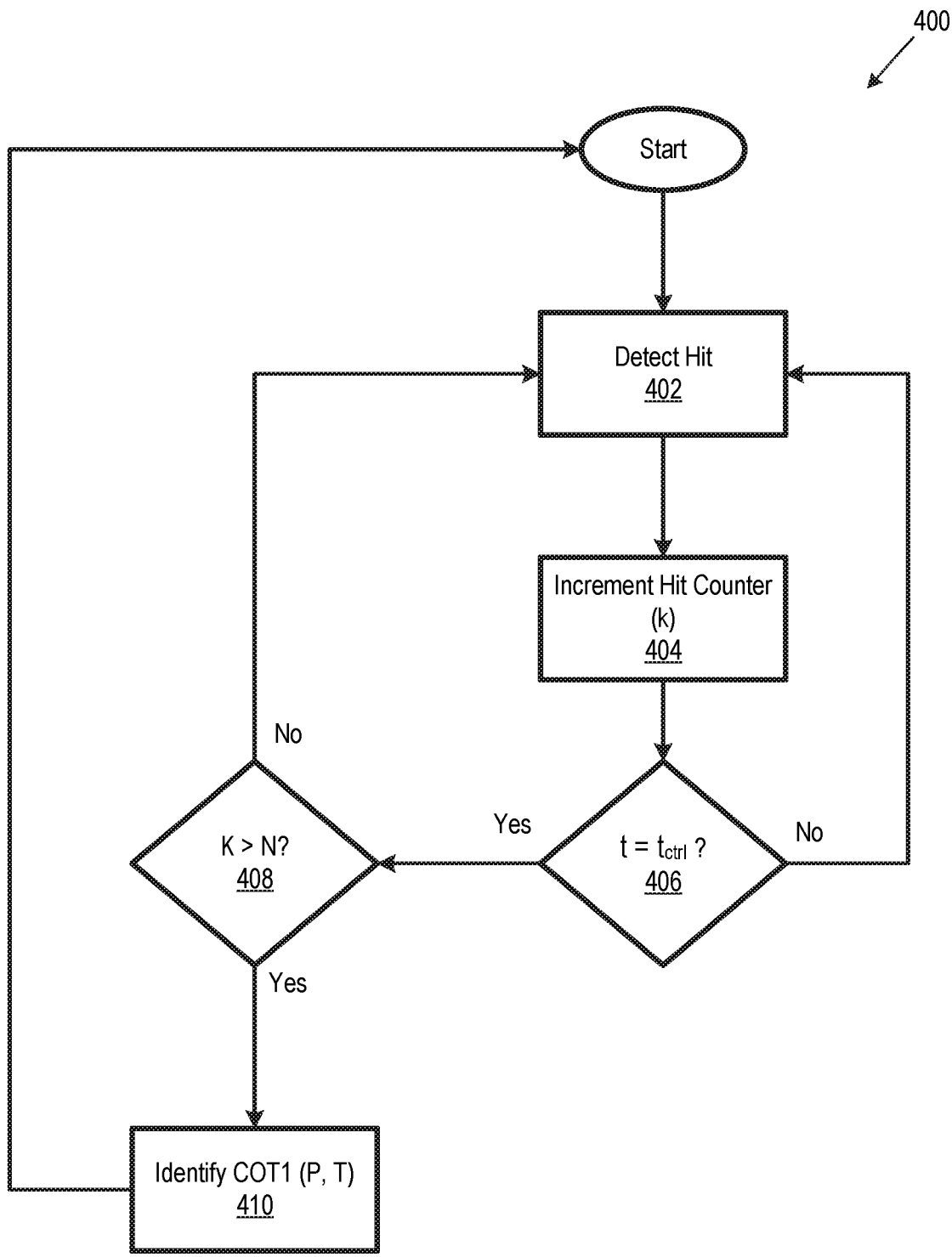
FIG. 4 is a flow chart illustrating a method for identifying the channel occupancy time (COT) of a base station, e.g. based on sync and system information signals transmitted over a beam broadcasted by a base station, according to an embodiment.

Accordingly, in block 206 of FIG. 2, UE device 104(1) attempts to identify COT1 from control information of the selected RF beam, e.g., from control 304(3) of selected RF beam 302(3). However, due to local interference visible by UE device 104(1) only, UE device 104(1) may not be able to receive the related broadcast COT1 control information. Accordingly UE device 104(1) cannot rely solely on receiving COT1 parameters transmitted by base station 102; instead, UE device 104(1) identifies COT1 from the related control information transmitted over the selected RF beam. For example, in some embodiments, processor 116(1) executes instructions 124(1), to perform a method 400 (FIG. 4) identifying COT1 from control information included in the selected RF beam. In block 402 of method 400, UE device 104(1) detects a hit, where a "hit" refers to the successful detection of a slot with control information (e.g. SSB) in the selected RF beam. In this document, a "slot" refers to a timing structure including a predetermined number of data symbols. For example, in some embodiments where wireless communication system 100 operates according to a NR protocol, a slot consists of 14 data symbols.

Figure 5:
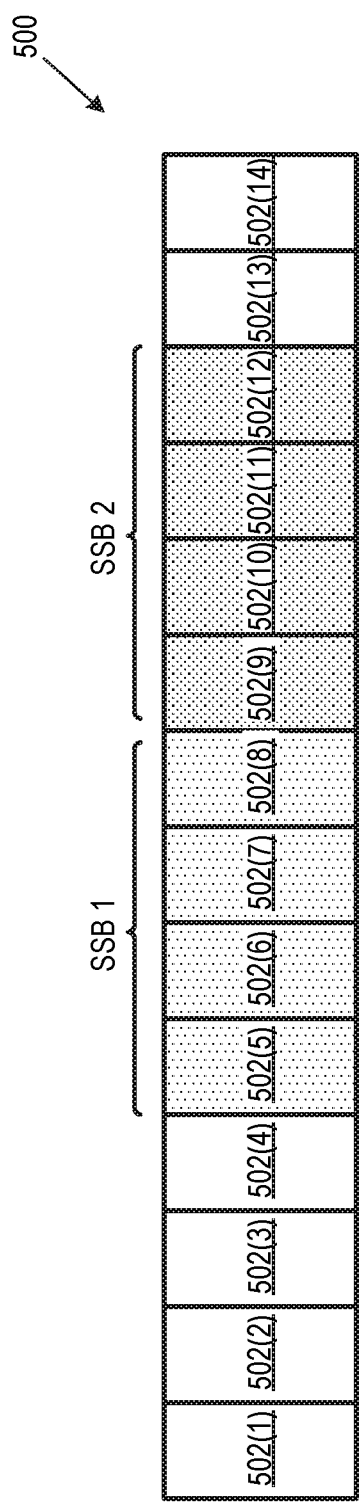
FIG. 5 is a time diagram illustrating an example of a sync and system information sequence transmitted during one slot, according to an embodiment.

FIG. 5 is a timing diagram illustrating a slot 500, which is one example of a slot including control information. Slot 500 includes 14 data symbols 502. Data symbols 502(5)-502(8) include control information in the form of a SSB 1, and data symbols 502(9)-502(12) include control information in the form of a SSB 2. One possible implementation of SSB 1 and SSB 2 are discussed below with respect to FIG. 7. Data symbols 502(1)-502(4), 502(13), and 502(14) do not include control information. The configuration of slot 500 could vary without departing from the scope hereof. For example, slot 500 could be modified to include a different number of data symbols 502, and slot 500 could be modified such that control information is dispersed among data symbols 502 in a manner different than that illustrated in FIG. 5. UE device 104(1) detects slot 500 as a hit in block 402 of FIG. 4 because slot 500 includes control information, i.e., SSB 1 or SSB 2.

Figure 6:
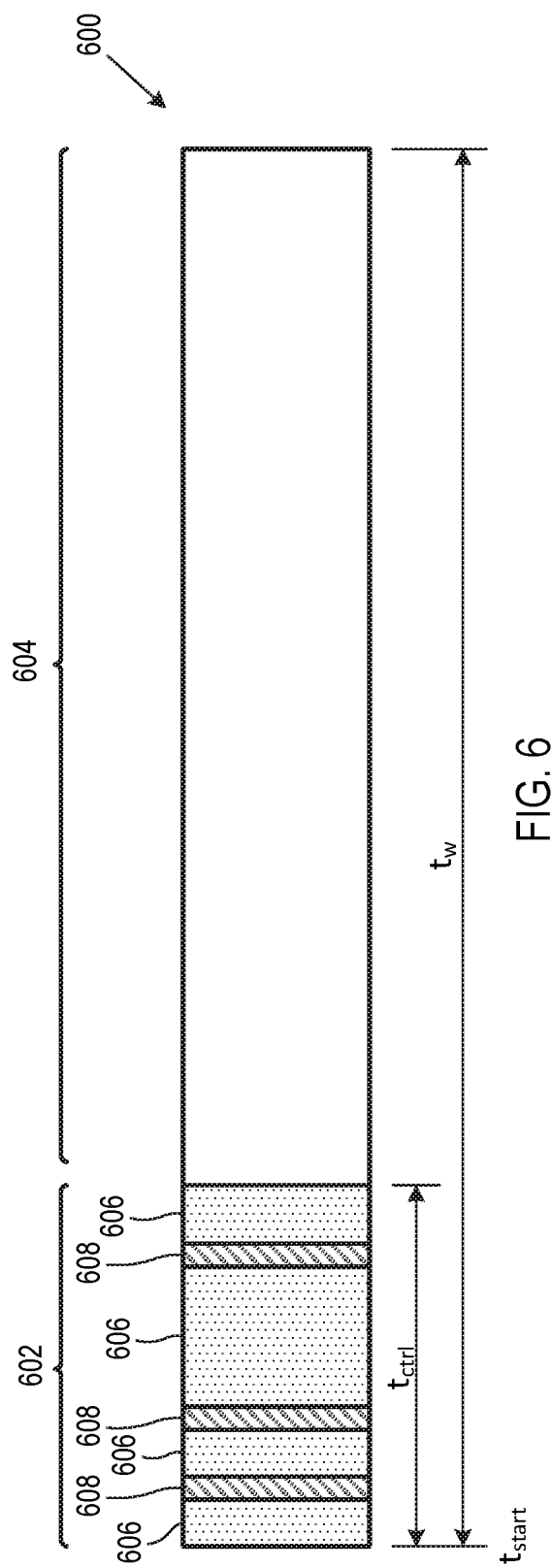
FIG. 6 is a time diagram illustrating a sequence of n slots transmitted with a repetition rate of $t_w$, according to an embodiment.

In block 404 of method 400, UE device 104(1) increments a counter (k) in response to a successful detection of SSB control information included in a RF beam(j), where j=1 .. . 8 in one embodiment (also termed as hit in FIG. 4) detected in block 402. In decision block 406, UE device 104(1) determines whether current time (t) is equal to a control information portion duration $t_{ctrl}$ of one or more symbols (in one embodiment one SSB could be transmitted over one beam during one symbol). If the number of counted hits over a control window timing ($t_{ctrl}$) is less than a predetermined number N (decision made in block 408), UE device 104(1) returns to block 402; if yes, UE device 104(1) considers that base station 102 took control over the air interface for a given amount of time (e.g. COT1). Accordingly, UE device 104(1) repeats steps 402 and 404 until the end of control information portion duration $t_{ctrl}$, selecting the highest receive level SSB across one of the beams detected, increases the counter k accordingly with the number of successfully decoded SSB across the same beam. In some embodiments, UE device 104(1) resets counter k at the end of the slot window or after a number of slots. For example, FIG. 6 is a timing diagram illustrating an analysis window 600, which is one embodiment of a slot window implemented by base station 102. Slot window 600 has a repetition period $t_w$. In some embodiments, base station 102 repeatedly broadcasts the time window 600 and performs a CCA before transmitting any information during each slot. Time window 600 includes a SSB control information portion 602 and a data portion 604. Control information portion 602 has a duration $t_{ctrl}$. During this SSB control information window 602, SSB blocks of information are transmitted repeatedly by base station 102 spanning across one or a few slots. In one embodiment, the symbols (of one slot) allocated for SSB transmissions could be represented by symbols 502(5) . . . 502(8) for SSB1 and 502(9) . . . 502(12) for SSB2, as described in FIG. 5. However, not all SSB control information, transmitted across one slot (as described in FIG. 5) may be detected on the receiver (Rx) side, due to the interference caused by the surrounding nodes using the un-licensed spectrum and degrading target UE 104(1) downlink (DL) Rx performance. For example, FIG. 6 illustrates control information portion 602 including sub-periods 606 where the SSB control information is properly detected and sub-periods 608 where the SSB control information is not detected. In one embodiment, each sub-period 606 and 608, presented in FIG. 6, may span across one symbol. Data portion 604 of slot window 600 does not include SSB control information, and data portion 604 is used, for example, to transmit data between base station 102 and UE devices 104. In one embodiment, duration $t_{ctrl}$ is 5 milliseconds (ms), and repetition period $t_w$ is 20 ms.

Referring again to FIG. 4, in decision block 408, UE device 104(1) determines if counter k is greater than a predetermined threshold value N. If the result of decision block 408 is yes, UE device 104(1) proceeds to block 410; if the result of decision block 408 is no, UE device 104(1) returns to block 402. Large values of threshold value N promote accurate identification of COT1, while small values of threshold N promote fast identification of COT1. Therefore, in some embodiments, threshold value N is selected to achieve a compromise between accuracy and speed of method 400.

In block 410, UE device 104 identifies COT1, which was claimed by serving base station 102. Base station 102 claimed the air interface, following a successful CCA procedure. In particular, UE device 104(1) identifies the starting point of the SSB control information sequence, for beam i (being the best received beam of all beams transmitted by base station 102) which overlaps with the base station 102 triggered COT1 period, i.e. a time when UE device 104(1) detects a first successful hit within slot window 602. The detection of the SSB control information takes place in block 402. The starting point of the sequence of control information is the starting time of COT1, e.g. time $t_{start}$ in FIG. 6. UE device 410 also identifies a priority class P and duration T of COT1, such as by detecting a specific preamble transmitted at the beginning of the COT transmission. In some embodiments, priority class P ranges from one to four, with one being the high priority class and corresponding smallest LBT wait time, and with four being the lowest priority class and corresponding longest LBT wait time.

Figure 7:
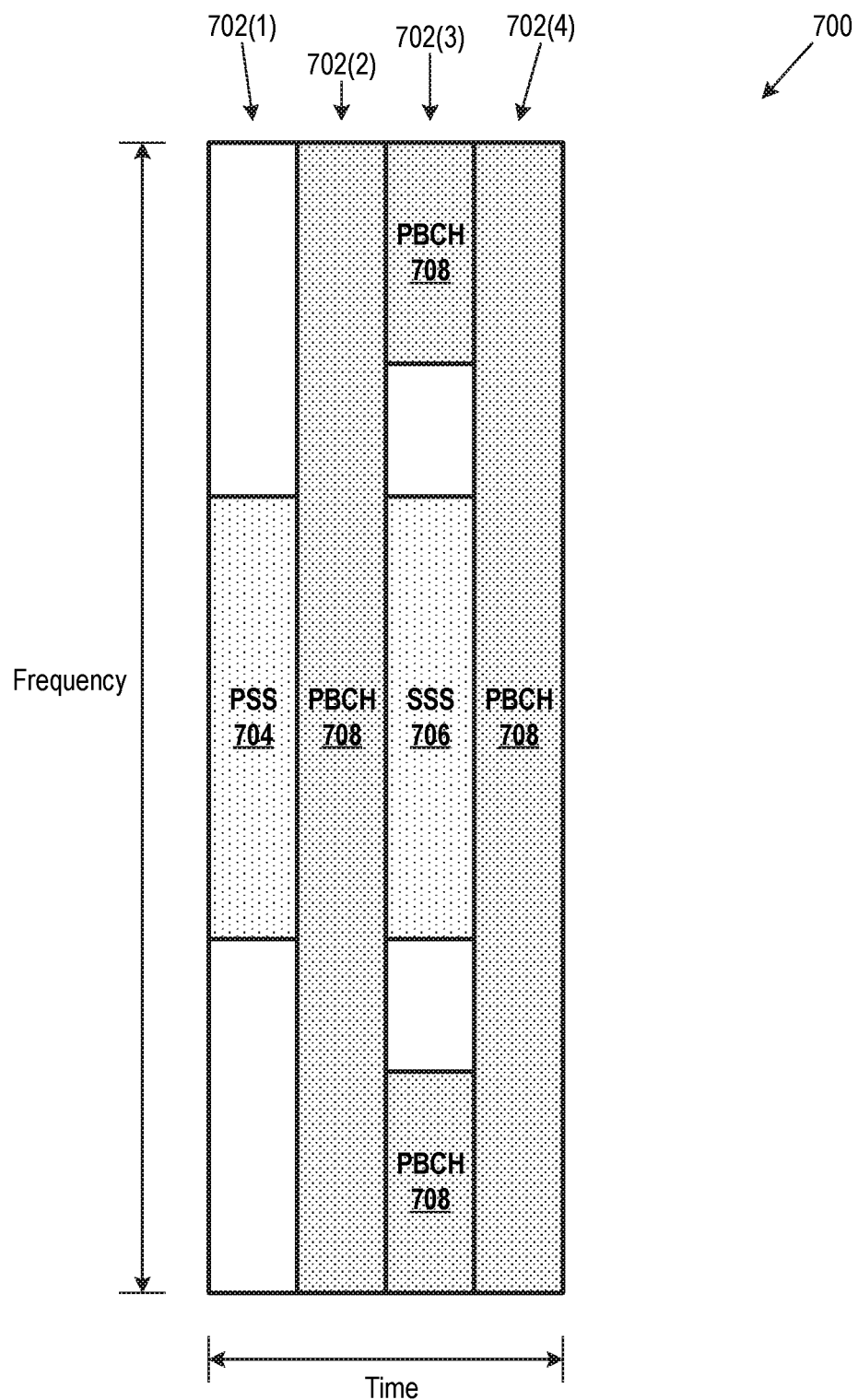
FIG. 7 is a schematic diagram illustrating one example of a sync and system information block of control information, according to an embodiment.

FIG. 7 is a schematic diagram illustrating one example of a block 700 of SSB control information in embodiments of wireless communication system 100 operating according to a NR protocol. Block 700 is one example of a portion of control information 304 of FIG. 3, as well one example of each of SSB 1 and SSB 2 of FIG. 5. It should be realized, however, that each of control information 304, SSB 1, and SSB 2 may have a different configuration without departing from the scope hereof. Block 700 spans four data symbols 702 and includes a Primary Synchronization Signal (PSS) 704, a Secondary Synchronization Signal (SSS) 706, and a Physical Broadcast Channel (PBCH) 708. PSS 704 is located within data symbol 702(1), and in some embodiments, PSS 704 spans 127 subcarriers in the frequency domain. In particular embodiments, PSS 704 synchronizes slots in wireless communication system 100. SSS 706 is located within data symbol 702(3), and in some embodiments, SSS 706 also spans 127 subcarriers in the frequency domain. In particular embodiments, SSS 706 synchronizes data frames in wireless communication system 100. PBCH 708 is distributed among each of data symbols 702(2)-702(4). In some embodiments, PBCH 708 spans 96 subcarriers in data symbol 702(3) and 240 subcarriers in data symbols 702(2) and 702(4), in the frequency domain. PBCH 708, for example, indicates properties of base station 102.

Figure 8:
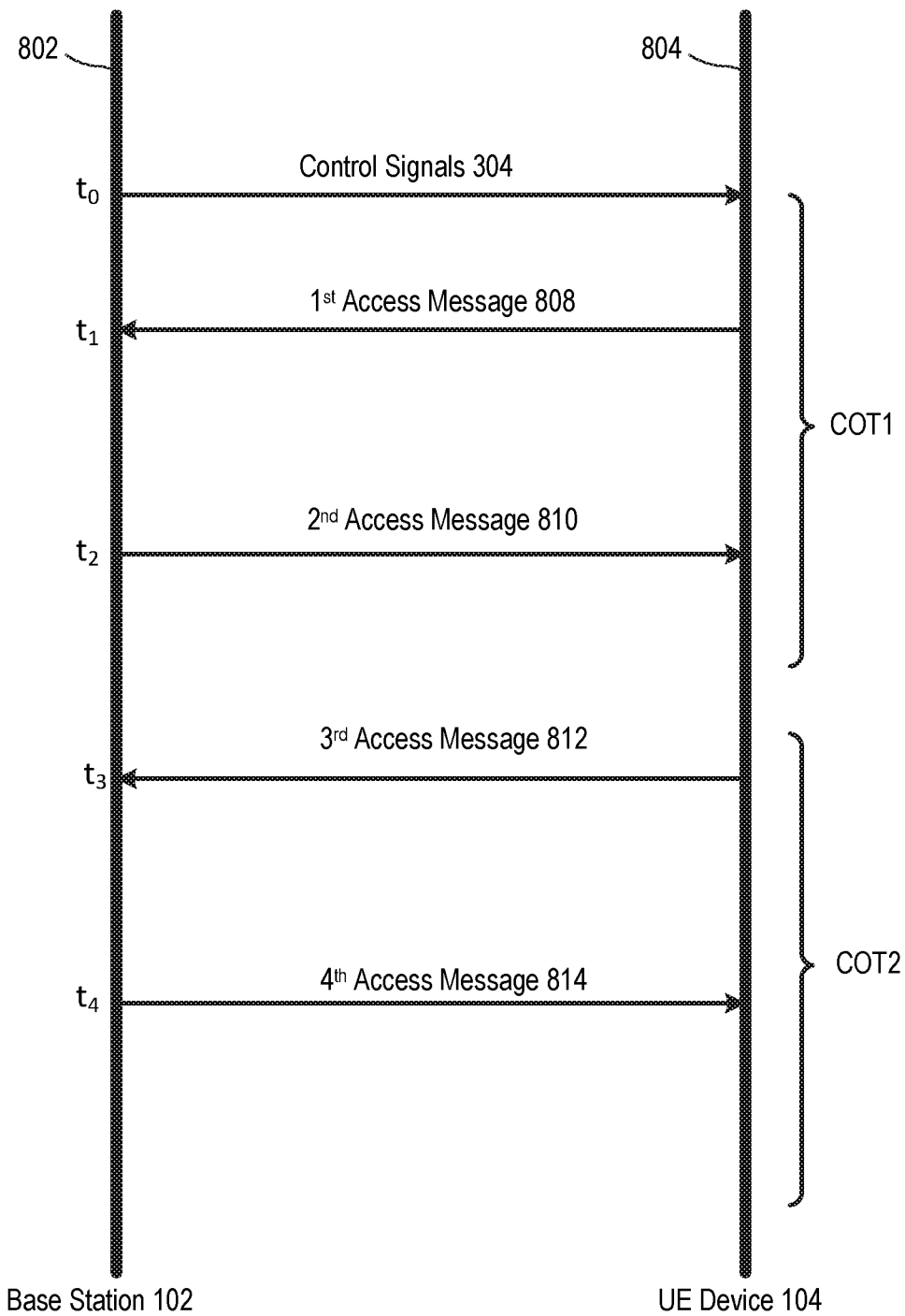
FIG. 8 is a simplified logical flow diagram illustrating the transmission sequence of radio signals exchanged between a base station and a UE device to allow the UE device to attach to the network, according to an embodiment.
Figure 9:
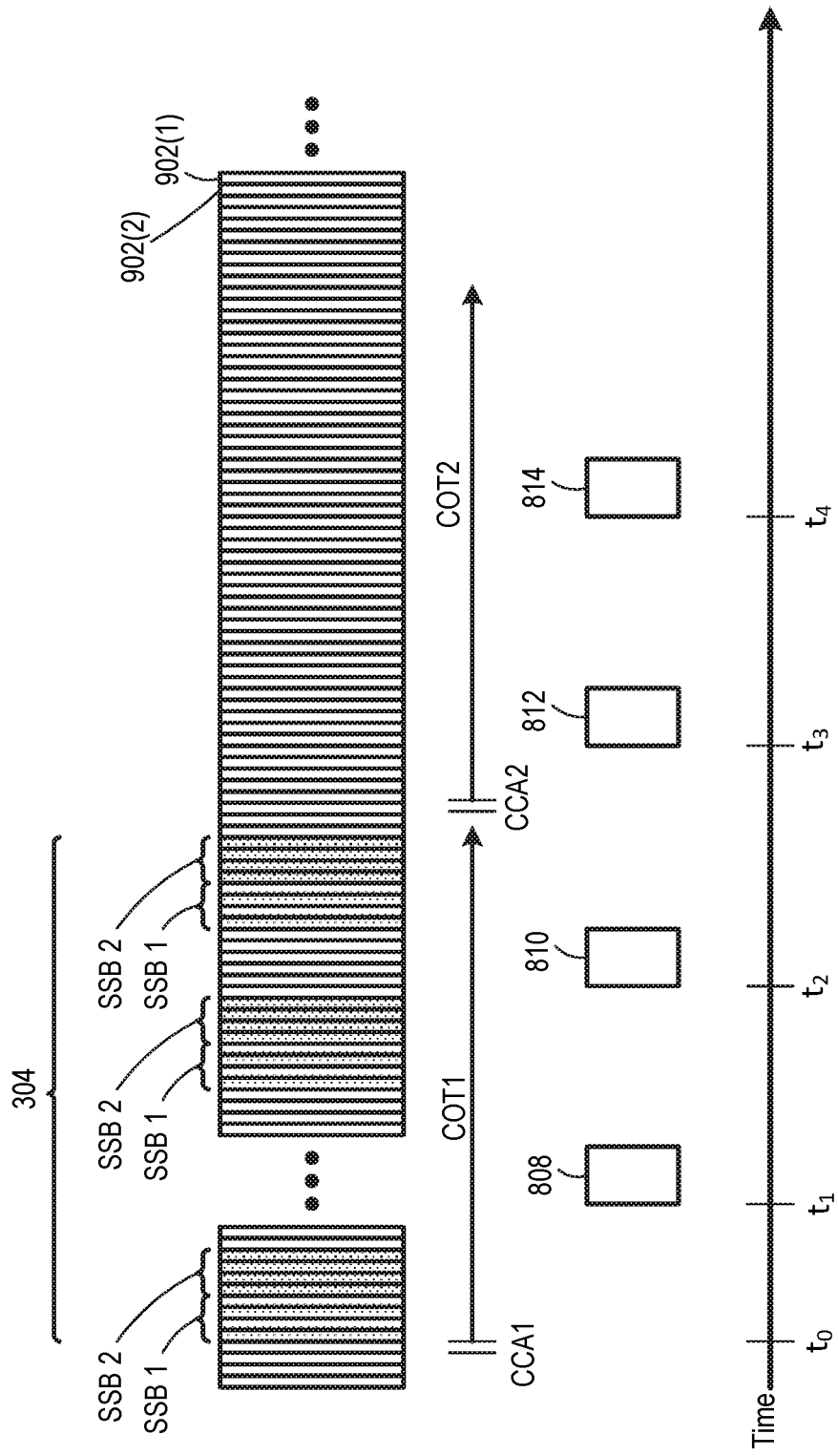
FIG. 9 is a time diagram illustrating one possible alignment of a COT transmission with the Random Access Channel signals exchanged between the base station and the UE device (the logical flow being depicted in FIG. 8).

In particular embodiments, base station 102 takes over the air interface for a period COT1, following a successful CCA procedure, in order to transmit the SSB control information. UE device 104(1) detects COT1 based on the algorithm presented in FIG. 4, in some embodiments. For example, FIG. 8 is a simplified logical flow diagram illustrating logical flow of signals exchanged between base station 102 and UE device 104(1) to allow the UE device to connect to the network. FIG. 9 is the time diagram backing the logical flow messaging transmission of radio signals depicted in FIG. 8. FIGS. 8 and 9 are further discussed together in the following discussion. In FIG. 8, vertical line 802 represents the logical base station 102 entity, and vertical line 804 represents the logical entity UE device 104.

At time $t_0$, base station 102 transmits SSB control signals 304 to UE device 104(1) during COT1, after performing a successful first clear channel assessment CCA1. In particular embodiments, control signals 304 are in the form of SSB 1 and SSB 2 as illustrated in FIG. 9, although the configuration of control signals 304 could vary without departing from the scope hereof. Base station 102 transmits controls signals 304 spread across multiple RF beams, such as illustrated in FIG. 3, in particular embodiments. If the CCA1 is unsuccessful, base station 102 performs a subsequent LBT procedure, i.e., base station 102 monitors the RF spectrum to determine when the RF spectrum is clear, before transmitting the following sequence of SSB control signals 304.

Base station 102 grants UE device 104(1) access transmission rights during COT1 (already acquired by base station 102), and UE device 104(1) accordingly transmits a first access message 808 to base station 102 during COT1 at time $t_1$ after a successful CCA. In some embodiments, first access message 808 includes a $1^{st}$ message of the NR physical random access channel (PRACh) message.

Base station 102 may transmit a second access message 810 to UE device 104(1) at time $t_2$ during COT1, in response to receiving first access message 808, during the same COT1 interval. In some embodiments, second access message 810 includes PRACh $2^{nd}$ message, e.g., a Physical Downlink Shared Channel (PDSCh) message. If UE device 104 does not receive second access message 810 during COT1, UE device 104 repeats transmission of first access message 808 during the same COT1 interval following the timing guideline provided by signal 708 PBCh, for example. In particular embodiments, first access message 808 and second access message 810 are transmitted via a single RF beam, e.g. selected RF beam 302(3).

If UE device 104(1) needs to transmit a third access message 812 outside the COT1 interval, then UE 104(1) performs a second clear channel assessment CCA2 following the successful reception of second access message 810. UE device 104(1) is assigned a second Channel Occupancy Time (COT2) if CCA2 is successful. If the CCA2 is unsuccessful, UE device 104(1) performs a LBT procedure at a later time, dependent on the LBT type allowed, i.e., UE device 104(1) monitors the RF spectrum to determine when the RF spectrum is clear, before obtaining COT2. UE device 104(1) transmits third access message 812 to base station 102 at time $t_3$ during COT2, after performing a successful CCA. In some embodiments, third access message 812 includes a PRACh message 3, e.g., transmitted over the Physical Uplink Channel Control (PUCCh). If the CCA performed by UE device 104(1) before transmitting third access message 812 is unsuccessful, UE device 104(1) performs a new CCA procedure based on the allowed LBT type, i.e., UE device 104(1) monitors the RF spectrum to determine when the RF spectrum is clear, before transmitting third access message 812. If the CCA executed before transmitting message 812 is successful, UE device 104(1) grants base station 102 transmission rights during COT2, and base station 102 sends a fourth access message 814 to UE device 104(1) at time $t_4$, re-using the COT2 transmission rights granted by UE 104(1). In some embodiments, fourth access message 814 includes PRACh message 4, e.g., transmitted across Physical Downlink Control Channel (PDSCh). In particular embodiments, third access message 812 and fourth access message 814 are transmitted via a single RF beam, e.g. selected RF beam 302(3).

Figure 10:
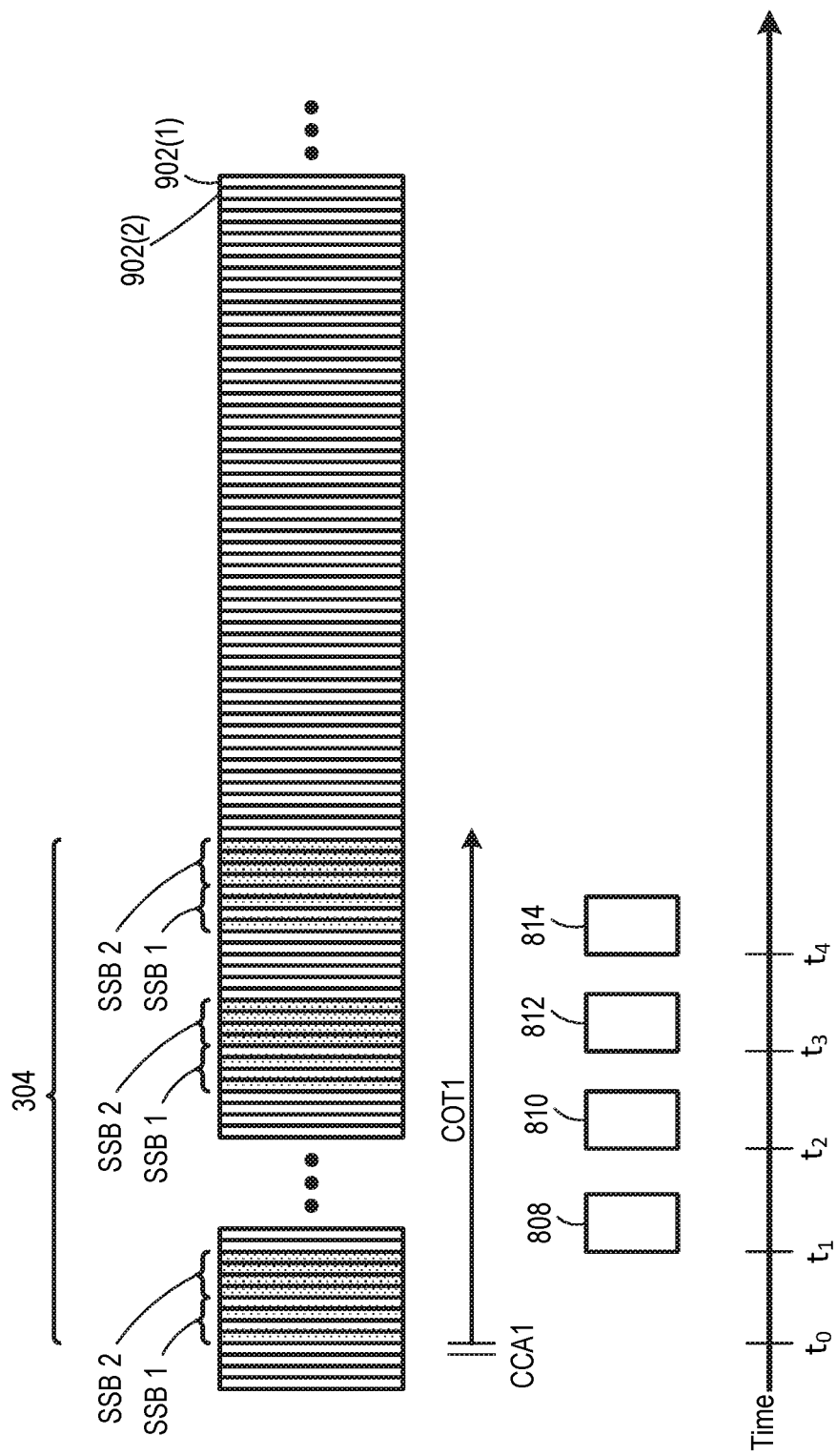
FIG. 10 is a time diagram illustrating another possible alignment of a COT transmission with the Random Access Channel signals exchanged between the base station and the UE.

Accordingly, the COT1 transmission rights acquired by base station 102 for transmitting the SSB control information could be extended to UE 104(1) in order to start or eventually complete a network access procedure over PRACh (e.g. message 808). UE device 104(1) could complete the PRACh procedure, if the COT1 interval doesn't allow the random access procedure for UE 104(1) by acquiring a subsequent COT2 interval. UE 104(1) could grant transmission rights to base station 102 in order to allow base station 102 to complete the random access procedure related to UE 104(1) (e.g. transmitting Message 814). In some alternate embodiments, all access messages are transmitted during COT1, thereby eliminating the need for COT2. For example, FIG. 10 is a schematic diagram illustrating transmission of radio signals between base station 102 and UE device 104(1) to establish a connection between the base station and the UE device, where all access messages 808, 808, 812, and 814 are transmitted during COT1.

Combinations of Features

Features described above may be combined in various ways without departing from the scope hereof. The following examples illustrate some possible combinations:

(A1) A method for establishing a wireless connection between a UE device and a base station in unlicensed RF spectrum may include (1) receiving, at the UE device, a plurality of RF beams broadcasted by the base station, (2) identifying a selected RF beam of the plurality of RF beams having control information detected based on a maximum received signal level, and (3) identifying a first channel occupancy time (COT1) of the base station from control information transmitted over the selected RF beam.

(A2) In the method denoted as (A1), identifying the COT1 may be performed at the UE device.

(A3) In any one of the methods denoted as (A1) and (A2), identifying the COT1 may include determining a repetition period, a starting time of the control information, and a COT1 duration of the selected RF beam.

(A4) Any one of the methods denoted as (A1) through (A3) may further include designating a starting point of the control information of the selected RF beam as a control information sequence starting point.

(A5) The method denoted as (A4) may further include determining the COT1 from at least (a) the control information sequence starting point, (b) a priority class of the control information of the selected RF beam, and (c) a duration of the COT1.

(A6) Any one of the methods denoted as (A1) through (A5) may further include granting, at the base station, access transmission rights to the UE device during COT1.

(A7) Any one of the methods denoted as (A1) through (A6) may further include transmitting a first access message from the UE device to the base station during COT1.

(A8) The method denoted as (A7) may further include transmitting a second access message from the base station to the UE device in response to receiving the first access message at the base station, during COT1.

(A9) The method denoted as (A8) may further include (1) in response to receiving the second access message at the UE device, performing a first clear channel assessment (CCA) at the UE device, and (2) in response to the first CCA being successful, (a) assigning a second channel occupancy time (COT2) to the UE device and (b) transmitting a third access message from the UE device to the base station.

(A10) The method denoted as (A9) may further include granting, at the UE device, transmission rights to the base station during COT2.

(A11) Any one of the methods denoted as (A9) and (A10) may further include transmitting a fourth access message from the base station to the UE device, in response to receiving the third access message at the base station, during COT2.

(A12) In the method denoted as (A11), the control information of the selected RF beam may include fifth Generation (5G) New Radio (NR) synchronization signal blocks (SSBs), and each of the first access message, the second access message, the third access message, and the fourth access message may include a respective NR physical random access channel (PRACh) message.

(A13) The method denoted as (A8) may further include transmitting a third access message from the UE device to the base station during COT1, in response to receiving the second access message at the UE device.

(A14) The method denoted as (A13) may further include transmitting a fourth access message from the base station to the UE device, in response to receiving the third access message at the base station.

(A15) In the method denoted as (A14), the synchronization information of the selected RF beam may include fifth Generation (5G) New Radio (NR) synchronization signal bursts (SSBs), and each of the first access message, the second access message, the third access message, and the fourth access message may include a respective NR physical random access channel (PRACh) message.

(A16) The method denoted as (A7) may further include retransmitting the first access message from the UE device to the base station, in response to failure to receive a second access message from the base station at the UE device during COT1.

(B1) A method for establishing a wireless connection between a UE device and a base station in unlicensed RF spectrum may include (1) broadcasting control information from the base station during a first channel occupancy time (COT1), (2) granting a plurality of UE devices access transmission rights during COT1, (3) receiving at the base station a first access message from a first UE device of the plurality of UE devices during COT1, and (4) transmitting a second access message from the base station to the first UE device during COT1, in response to receiving the first access message.

(B2) The method denoted as (B1) may further include (1) receiving at the base station a third access message during a second channel occupancy time (COT2), and (2) transmitting a fourth access message from the base station to the first UE device during COT2, in response to receiving the third access message.

(B3) In the method denoted as (B2), the control information may include fifth Generation (5G) New Radio (NR) synchronization signal blocks (SSBs), and each of the first access message, the second access message, the third access message, and the fourth access message may include a respective NR physical random access channel (PRACh) message.

(C1) A user equipment (UE) device may include an antenna, a transceiver communicatively coupled to the antenna, a memory, and a processor communicatively coupled to the memory. The processor may be configured to execute instructions stored in the memory to (1) identify a selected radio frequency (RF) beam of a plurality of RF beams received via the antenna and the transceiver, the selected RF beam having control information with a maximum received signal level, and (2) identify a first channel occupancy time (COT1) of a base station separate from the UE device, from control information of the selected RF beam.

(C2) In the UE device denoted as (C1), the processor may be further configured to execute instructions stored in the memory to determine a repetition period, a starting time of the control information, and a COT1 duration of the selected RF beam.

(C3) In any one of the UE devices denoted as (C1) and (C2), the processor may be further configured to execute instructions stored in the memory to designate a starting point of the control information of the selected RF beam as a control information sequence starting point.

(C4) The UE device denoted as (C3) may further include determining the COT1 from (a) the control information sequence starting point, (b) a priority class of the control information of the selected RF beam, and (c) a duration of the COT1.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:
1. A method for establishing a wireless connection between a user equipment (UE) device and a base station in unlicensed radio frequency (RF) spectrum, comprising:
receiving, at the UE device, a plurality of RF signals broadcasted by the base station;
identifying a selected RF signal of the plurality of RF signals based on a maximum received signal level;

detecting, in the selected RF signal, a plurality of slots including control information;

incrementing a counter each time a slot including control information is detected in the selected RF signal; and in response to the counter exceeding a threshold value, identifying a first channel occupancy time (COT1) of the base station from control information transmitted over the selected RF signal.

2. The method of claim 1, wherein identifying the COT1 is performed at the UE device.

3. The method of claim 1, wherein identifying the COT1 comprises determining a repetition period, a starting time of the control information transmitted over the selected RF signal, and a COT1 duration of the selected RF signal.

4. The method of claim 3, further comprising designating a starting point of the control information transmitted over the selected RF signal as a control information sequence starting point.

5. The method of claim 4, further comprising determining the COT1 from at least (a) the control information sequence starting point, (b) a priority class of the control information transmitted over the selected RF signal, and (c) a duration of the COT1.

6. The method of claim 1, further comprising granting, at the base station, access transmission rights to the UE device during COT1.

7. The method of claim 6, further comprising transmitting a first access message from the UE device to the base station during COT1.

8. The method of claim 7, further comprising transmitting a second access message from the base station to the UE device in response to receiving the first access message at the base station, during COT1.

9. The method of claim 7, further comprising retransmitting the first access message from the UE device to the base station, in response to failure to receive a second access message from the base station at the UE device during COT1.

10. The method of claim 8, further comprising:

in response to receiving the second access message at the UE device, performing a first clear channel assessment (CCA) at the UE device; and in response to the first CCA being successful, (a) assigning a second channel occupancy time (COT2) to the UE device and (b) transmitting a third access message from the UE device to the base station.

11. The method of claim 10, further comprising granting, at the UE device, transmission rights to the base station during COT2.

12. The method of claim 11, further comprising transmitting a fourth access message from the base station to the UE device, in response to receiving the third access message at the base station, during COT2.

13. The method of claim 12, wherein:

the control information transmitted over the selected RF signal comprises fifth Generation (5G) New Radio (NR) synchronization signal blocks (SSBs); and each of the first access message, the second access message, the third access message, and the fourth access message comprises a respective NR physical random access channel (PRACh) message.

14. The method of claim 8, further comprising transmitting a third access message from the UE device to the base station during COT1, in response to receiving the second access message at the UE device.

15. The method of claim 14, further comprising transmitting a fourth access message from the base station to the UE device, in response to receiving the third access message at the base station.

16. The method of claim 15, wherein:

the control information transmitted over the selected RF signal comprises fifth Generation (5G) New Radio (NR) synchronization signal blocks (SSBs); and each of the first access message, the second access message, the third access message, and the fourth access message comprises a respective NR physical random access channel (PRACh) message.

17. A user equipment (UE) device, comprising:

an antenna;

a transceiver communicatively coupled to the antenna;

a memory; and a processor communicatively coupled to the memory, wherein the processor is configured to execute instructions stored in the memory to:

identify a selected radio frequency (RF) signal of a plurality of RF signals received via the antenna and the transceiver, the selected RF signal having a maximum received signal level, detect, in the selected RF signal, a plurality of slots including control information, increment a counter each time a slot including control information is detected in the selected RF signal, and in response to the counter exceeding a threshold value, identify a first channel occupancy time (COT1) of a base station separate from the UE device, from control information of the selected RF signal.

* * * * *